Oct. 15, 1957     C. D. CARSWELL     2,809,848
VEHICLE SPLASH GUARD WITH HINGED DETACHABLE SECTIONS
Filed June 18, 1954
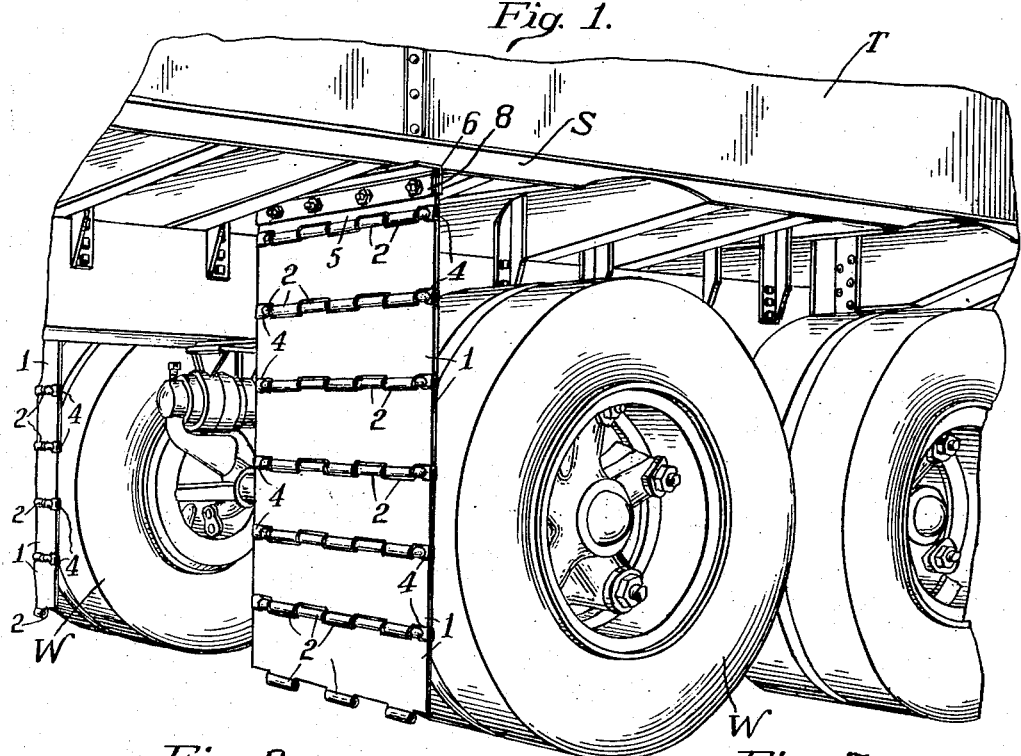
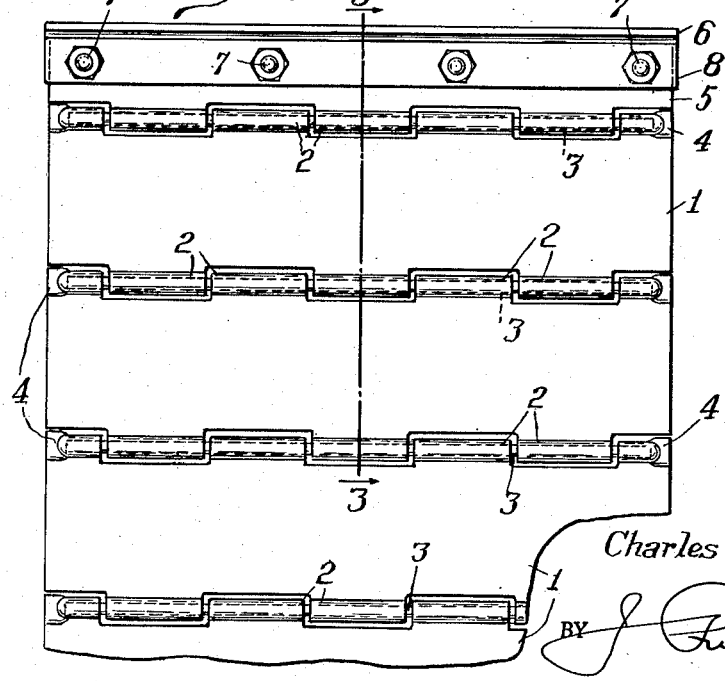
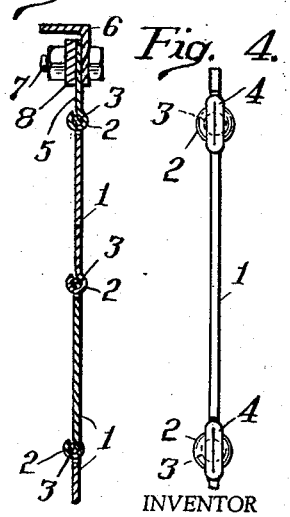
INVENTOR
Charles David Carswell
BY
ATTORNEY

2,809,848

VEHICLE SPLASH GUARD WITH HINGED DETACHABLE SECTIONS

Charles D. Carswell, Brunswick, Ga.

Application June 18, 1954, Serial No. 437,618

4 Claims. (Cl. 280—154.5)

This invention relates to improvements in splash guards adapted for use on commercial trailers and trucks that haul freight, to guard the wheels against splashing mud and foreign matter upward onto following vehicles or on the body of the trailer or truck itself.

The primary purpose of the splash guard is to protect vehicles which may be following the trailer or truck. The splash guard will prevent the large wheels of the trailer or truck, particularly the dual wheels, from throwing objects back onto the vehicle immediately following the trailer or truck. As a matter of fact, a number of States have laws which require the equipping of a trailer or truck on the highway with the splash guard device in order to afford protection to the drivers of the vehicles following the trailer or truck. There have been instances where bricks or such objects were lodged between dual wheels and then thrown from the wheels by the force of movement onto a vehicle in the rear and resulting in a broken windshield and the like.

Various devices have been proposed heretofore for this purpose, but these have been subject to many objections. They have been expensive to manufacture, are short-lived, are not universally applicable to many different forms and sizes of trailers, have often been of flexible sheet material, and thus ineffective, etc.

One object of this invention is to improve the construction of splash guards for trucks and trailers, particularly, to enable these to be manufactured inexpensively and to be applied readily to many different sizes and types of trucks and trailers.

Another object of the invention is to provide a splash guard of sectional form, the sections of which may be hinged together, and are also detachably connected with each other, so as to permit of ready removal and replacement of one or more sections that may be damaged in service.

Still another object of the invention is to provide a splash guard formed of sections so connected together that these may be sold either individually or connected in rolls so as to be assembled to the required extent by the user thereof with any suitable or desired number of sections.

These objects may be accomplished by providing sections of flat metal plates, such as galvanized steel, of sufficient width, transversely of the guard, so as to cover single or dual wheels on the truck or trailer, according to the application thereof desired. Provision is made for detachably and pivotally connecting the sections together at the adjacent edges thereof through rods passing through loops on the sections, which not only provides flexibility in the guard, but also permits of detachment and replacement of damaged sections therein to any extent required. Any suitable means may be provided for mounting the guard on the truck or trailer, such as a bracket, angle bar, or the like, that permits the guard to be attached easily and securely thereto and which provides an inexpensive construction.

This embodiment of the invention is illustrated in the accompanying drawings in which:

Fig. 1 is a perspective view of a portion of a truck or trailer showing the improved splash guard applied thereto;

Fig. 2 is a rear elevation of the guard detached;

Fig. 3 is a partial sectional view thereof on the line 3—3 in Fig. 2; and

Fig. 4 is an edge view of a portion of the guard.

The invention is shown as applied to a vehicle, such as a truck or trailer, generally designated at T, provided with the usual dual supporting wheels W, which are often assembled in multiple relation, two of which are shown at each opposite side of the truck or trailer T. The truck or trailer T is also provided with a suitable frame structure having side sills S and bracing extending therebetween.

The splash guard comprises a plurality of sections, generally designated by the numeral 1, having a width transversely of the guard sufficient to overlap the wheel or dual wheels covered thereby. In the example illustrated, where the guard covers dual wheels, these may have a width of twenty-four inches, while the length of each section may be approximately six inches in the example illustrated. Each section preferably is formed of a flat steel plate, such as galvanized steel, that has sufficient strength and rigidity for the purpose desired. It is preferred that all sections be identical for ready interchangeability.

Each of the sections is provided with rolled loops, generally indicated at 2, spaced at intervals along the width thereof to receive therein a hinge rod 3 telescoped through the loops 2 of each adjacent pair of sections 1. These loops 2 are staggered at opposite edges of each section so as to interfit readily with adjacent sections. Any suitable means, as desired, may be used for retaining the hinge rods 3 in place, such as nuts, pins or the like. However, it is preferred that the rolled loops at the ends of each hinge rod be crimped together, as shown at 4, to enclose the ends of the hinge rod 3 therein, and thus prevent easy removal of the hinge rod in service. However, such a crimp may be opened by forcing the metal apart or reshaping the curved loop to permit of removal of the hinge rod when separation of the sections is desired. This forms a simple and inexpensive hinged connection between the respective sections, which not only provides flexibility in the guard, but also permits the sections to be manufactured and sold separately and connected together readily by the user, or the sections may be detached or separated for removal or replacement of worn or damaged sections when desired.

At the upper end of the splash guard, a half-section is illustrated at 5, which may be manufactured of smaller size, or may be split from an edge of one of the main sections 1. This forms the support section for the splash guard and is adapted to be connected with a suitable support on the trailer T. In the example illustrated, an angle bar is shown at 6 secured by welding, riveting, or other fastening means, to the sills S and frame structure of the truck or trailer T and extending transversely of the guard at the upper edge thereof. The supporting section 5 is secured to the mounting bracket or angle bar 6 by bolts 7 spaced at intervals along the length thereof. It is preferred that a bar 8 also extend over the face of the mounting section 5 to clamp the latter between the bar 8 and one of the flanges of the angle bar 6. This forms a secure and yet a detachable connection between the splash guard and the truck or trailer which may be applied easily and inexpensively thereto, and the entire splash guard may be removed from the support when desired.

The splash guard constructed as described has sufficient weight to hang vertically behind the wheels and to protect following vehicles, as well as the upper portion of the truck or trailer, against the splashing of mud and foreign matter from the wheels. Being made of sections, these may be sold to truck fleet operators, either as individual sections or may be made up into rolls, so that each user may remove therefrom the desired number of sections for attachment to each side of the truck or trailer behind the rear wheels thereof, and to serve as a splash guard for the wheels. Moreover, sections may be substituted in the guard when some of them become damaged, merely by removal of the desired rods 3 in the hinges thereof and replacement of the sections to any required extent. Thus, when one of the sections becomes bent or broken, it may be replaced very readily and easily with a new section, without the necessity for replacement of the entire splash guard.

This construction supplies a splash guard that is not only simple and inexpensice, but fills many needs that have not been supplied heretofore by splash guards heretofore available or suggested. Thus, it is a substantial improvement, accomplishing the results pointed out above.

While the invention has been illustrated and described in one embodiment, it is recognized that variations and changes may be made therein without departing from the invention as set forth in the claims.

I claim:

1. A splash guard for a truck, trailer or the like, comprising a plurality of sections, means hingedly connecting the sections together, said hinge means including interconnected and axially aligned loops on adjacent edges of the sections, and a hinge rod extending through the loops and interconnecting the sections thereby, the outermost loops on one of the interconnected sections projecting axially beyond the ends of the hinge rod thereof and crimped together at the ends of said rod detachably retaining the rod therein.

2. A splash guard for a truck, trailer or the like, comprising a plurality of sheet metal sections, each of the sections having rolled loops at spaced intervals along an edge thereof interengaged with similar loops on the adjacent section and axially aligned therewith, a hinge rod extending through the loops and interconnecting the sections together, the loops on one of the sections projecting axially beyond the ends of the hinge rod and having the sides thereof crimped together beyond said ends of the rod securing the rod against axial displacement from the loops.

3. A splash guard for a truck, trailer or the like, comprising at least three sheet metal sections of identical size and shape, each of the sections having rolled loops at spaced intervals along an edge thereof interengaged with similar loops on the adjacent section and axially aligned therewith, and a plurality of hinge rods each extending through the aligned loops on a pair of adjacent sections and interconnecting such sections together, the loops in each row of aligned loops projecting axially beyond the ends of the hinge rod therein and having the sides thereof crimped together beyond said ends of such rod for securing the rod against axial displacement from the loops.

4. A splash guard for a truck, trailer or the like, comprising at least three sections of sheet metal and of identical size and shape arranged edge to edge, each of the sections having axially aligned rolled loops along each opposite edge thereof, the rolled loops along each edge being spaced apart and in staggered relation to the loops spaced along the opposite edge of each section, a plurality of hinge rods each extending through all of the aligned loops of a pair of adjacent sections and hingedly connecting such sections together, said hinge rods being removable for the purpose of adjusting the length of the guard, and means for securing said sections to a truck, trailer or the like.

References Cited in the file of this patent

UNITED STATES PATENTS

| 31,250 | Letz | Jan. 29, 1861 |
| 1,843,340 | Satake | Feb. 2, 1932 |
| 2,405,262 | Lindsay | Aug. 6, 1946 |
| 2,546,781 | Rheeling | Mar. 27, 1951 |
| 2,571,413 | Botz | Oct. 16, 1951 |
| 2,591,196 | Post | Apr. 1, 1952 |
| 2,652,266 | Miller | Sept. 15, 1953 |

FOREIGN PATENTS

| 44,811 | Sweden | Jan. 18, 1917 |